(12) United States Patent
Deng (10) Patent No.: US 9,479,060 B2
(45) Date of Patent: Oct. 25, 2016

(54) CONTROL CIRCUIT, BATTERY POWER SUPPLY DEVICE AND CONTROL METHOD

(71) Applicant: Silergy Semiconductor Technology (Hangzhou) LTD, Hangzhou, ZheJiang Province (CN)

(72) Inventor: Fuhua Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/719,662

(22) Filed: May 22, 2015

(65) Prior Publication Data

US 2015/0364997 A1 Dec. 17, 2015

(30) Foreign Application Priority Data

Jun. 13, 2014 (CN) .......................... 2014 1 0264471

(51) Int. Cl.
*H02M 3/158* (2006.01)
*H02M 1/00* (2006.01)

(52) U.S. Cl.
CPC ......... *H02M 3/1588* (2013.01); *H02M 3/1582* (2013.01); *H02M 2001/0025* (2013.01); *Y02B 70/1466* (2013.01)

(58) Field of Classification Search
CPC ..................................................... H02M 3/158
See application file for complete search history.

(56) References Cited

U.S. PATENT DOCUMENTS

| | | | |
|---|---|---|---|
| 8,450,979 B2 | 5/2013 | Kerr et al. | |
| 2008/0231233 A1 | 9/2008 | Thornton | |
| 2014/0145679 A1* | 5/2014 | Chen .................. | H02M 3/1582 320/128 |
| 2014/0152239 A1* | 6/2014 | Yao ...................... | H02J 7/0081 320/107 |
| 2014/0159644 A1* | 6/2014 | Kung ..................... | H02J 7/022 320/107 |
| 2014/0203763 A1 | 7/2014 | Zhao et al. | |

* cited by examiner

*Primary Examiner* — Emily P Pham
(74) *Attorney, Agent, or Firm* — Michael C. Stephens, Jr.

(57) ABSTRACT

A control circuit can include: (i) a boost mode controller configured to control a switch type converter to operate in a boost mode such that an input current is less than a first input current threshold, where the switch type converter comprises a first terminal coupled to a power supply line from an external power supply to a load, and a second terminal coupled to a battery; (ii) a buck mode controller configured to control the switch type converter to operate in a buck mode; and (iii) a select circuit configured to select either the boost mode controller or the buck mode controller to control the switch type converter based on a detected value of the input current of the external power supply and a detected value of a battery charging/discharging current.

16 Claims, 9 Drawing Sheets

FIG. 8

# CONTROL CIRCUIT, BATTERY POWER SUPPLY DEVICE AND CONTROL METHOD

RELATED APPLICATIONS

This application claims the benefit of Chinese Patent Application No. 201410264471.3, filed on Jun. 13, 2014, which is incorporated herein by reference in its entirety.

FIELD OF THE INVENTION

The present invention generally relates to the field of power electronics, and more specifically to a battery powered circuit, supply device, and an associated method.

BACKGROUND

Battery powered circuits are widely applied in various electronic products, such as smart phones, tablets, and laptop computers. In a laptop computer example, an adaptor may be used to power a computer system and a battery. The battery can directly supply power to the computer system when the external power supply is off-line (disconnected). Also, a power converter can be situated between the adapter and the computer system and battery for power conversion.

SUMMARY

In one embodiment, a control circuit can include: (i) a boost mode controller configured to control a switch type converter to operate in a boost mode such that an input current is less than a first input current threshold, where the switch type converter comprises a first terminal coupled to a power supply line from an external power supply to a load, and a second terminal coupled to a battery; (ii) a buck mode controller configured to control the switch type converter to operate in a buck mode; and (iii) a select circuit configured to select either the boost mode controller or the buck mode controller to control the switch type converter based on a detected value of the input current of the external power supply and a detected value of a battery charging/discharging current.

In one embodiment, a method of controlling a switch type converter can include: (i) selecting a boost mode or a buck mode according to a detected value of an input current of an external power supply and a detected value of a battery charging/discharging current, to control a switch type converter, where the switch type converter comprises a first terminal coupled to a power supply line from the external power supply to a load, and a second terminal coupled to a battery; (ii) controlling an input current of the external power supply to be less than a first input current threshold when the switch type converter operates in the boost mode; and (iii) controlling the battery charging current to charge the battery when the switch type converter operates in the buck mode.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switch type converters can be used to charge chargeable batteries in electronic devices. When an external power supply (e.g., a power adapter) is connected to an electronic device with a chargeable battery, the external power supply may supply power to an internal load of the electronic device, and a switch type converter may simultaneously charge the battery. As both the currents for the load and the chargeable battery are provided by the external power supply, the external power supply should have the ability to power the maximum load of the electronic device, even for a relatively short time. Usually, the external power supply is an adaptor with a rated power to convert an AC power supply to a DC power supply, and when the load power is greater than the rated power of the adaptor, the adaptor may be damaged.

In one embodiment, a control circuit can include: (i) a boost mode controller configured to control a switch type converter to operate in a boost mode such that an input current is less than a first input current threshold, where the switch type converter comprises a first terminal coupled to a power supply line from an external power supply to a load, and a second terminal coupled to a battery; (ii) a buck mode controller configured to control the switch type converter to operate in a buck mode; and (iii) a select circuit configured to select either the boost mode controller or the buck mode controller to control the switch type converter based on a detected value of the input current of the external power supply and a detected value of a battery charging/discharging current.

Figure 1:
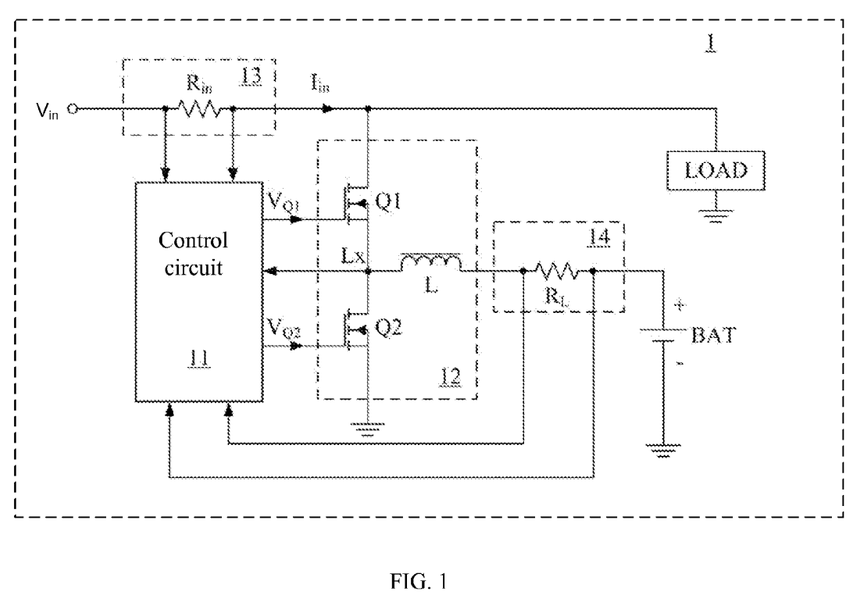
FIG. 1 is a schematic block diagram of an example battery power supply device, in accordance with embodiments of the present invention.

Referring now to FIG. 1, shown is a schematic block diagram of an example battery power supply device, in accordance with embodiments of the present invention. In this particular example, battery power supply device 1 can include control circuit 11, switch type converter 12, input current detector 13, and battery charging/discharging current detector 14. For example, switch type converter 12 can be an H-bridge switch type converter, with a first terminal connected to a power supply line from external power supply $V_{in}$ to the load. The first terminal of external power supply $V_{in}$ that coupled with switch type converter 12 can also connect to the load, as external power supply is coupled to the load (e.g., the internal load). The second terminal of switch type converter 12 can connect to battery "BAT." In this way, external power supply $V_{in}$ can the battery by switch type converter 12, as well as supply power to the load.

For example, switch type converter 12 can include power switches (e.g., power MOS transistors) Q1 and Q2 connected in series between external power supply $V_{in}$ and ground, and which can be controlled according to control signals (e.g., $V_{Q1}$ and $V_{Q2}$) at their respective control terminals (e.g., gates). Switch type converter 12 can also include inductor L coupled between node Lx of power switches Q1 and Q2, and the second terminal of switch type converter 12. Switch type converter 12 can be configured as a buck topology from the external power supply to the battery (e.g., from the first terminal to the second terminal), and as a boost topology from the battery to the load (e.g., from the second terminal to the first terminal).

Switch type converter 12 can be configured to operate in either a buck mode or a boost mode based on input current $I_{in}$ of external power supply $V_{in}$ and a required current for the load. When the required current is relatively low, a current can be obtained from external power supply $V_{in}$ to charge the battery, and switch type converter 12 may operate in the buck mode. However, when the required current is relatively high, the battery can be discharged to the load by switch type converter 12, which can operate in the boost mode. Further, when input current $I_{in}$ of the external power supply increases significantly along with the required current increasing due to an increasing load, the battery can supply power to the load along with external power supply $V_{in}$. In this case, switch type converter 12 may operate in a boost mode, and the external power supply may be protected by decreasing input current $I_{in}$ of the external power supply.

When switch type converter 12 operates in a buck mode, the first terminal connected with the power supply line from external power supply $V_{in}$ to the load can be configured as the input terminal, and the second terminal connected to the battery can be configured as the output terminal. When switch type converter 12 operates in a boost mode, the second terminal connected with the battery can be configured as the input terminal, and the first terminal connected with the power supply line from external power supply $V_{in}$ to the load can be configured as the output terminal. In the example of FIG. 1, input current detector 13 can be implemented by sampling resistor $R_{in}$, connected between the first terminal of switch type converter 12 and external power supply $V_{in}$. The voltage across sampling resistor $R_{in}$, can represent input current $I_{in}$.

For example, battery charging/discharging current detector 14 can be implemented by sampling resistor $R_L$ coupled between the second terminal and the battery. The voltage across sampling resistor $R_L$ can represent inductor current $I_L$ flowing through inductor L. Since inductor L can connect between node Lx and the battery, when switch type converter 12 operates in a buck mode, inductor current $I_L$ flows to the battery from node Lx and equals charging current $I_{CHG}$. Thus, the voltage across sampling resistor $R_L$ can be used as the detected value of charging current $I_{CHG}$. When switch type converter operates in a boost mode, inductor current $I_L$ flows to node Lx from the battery and equals discharging current $I_{DIS}$. Thus, the voltage across sampling resistor $R_L$ can be used as the detected value of discharging current $I_{DIS}$. Those skilled in the art will recognize that other approaches to sample charging current $I_{CHG}$ or discharging current $I_{DIS}$ can be utilised in particular embodiments. Also, switch type converter 12 can be controlled by control circuit 11.

Figure 2:
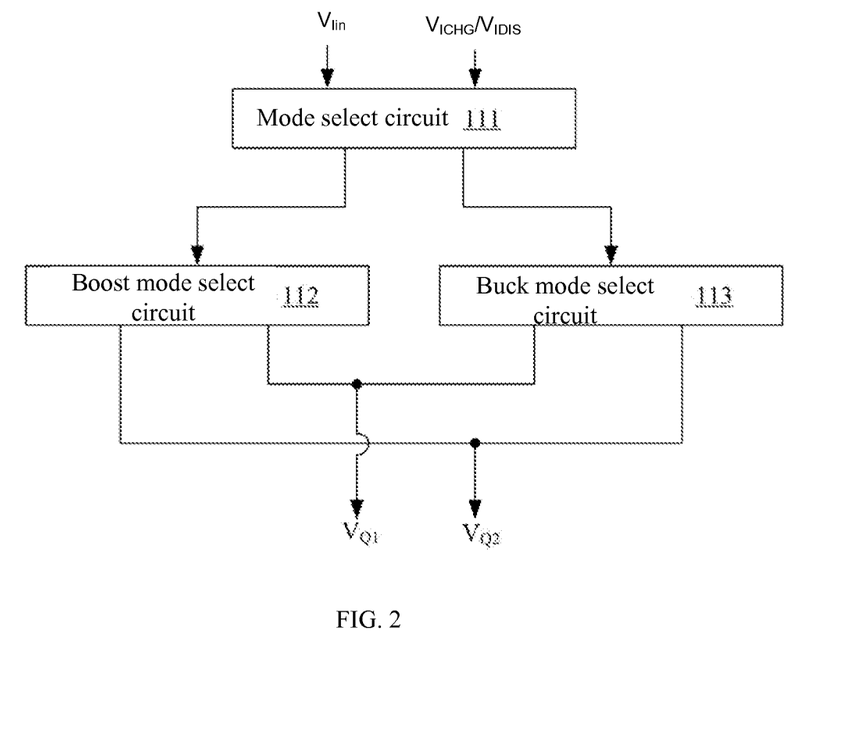
FIG. 2 is a schematic block diagram of an example control circuit, in accordance with embodiments of the present invention.

Referring now to FIG. 2, shown is a schematic block diagram of an example control circuit, in accordance with embodiments of the present invention. In this particular example, control circuit 11 can include select circuit 111, boost mode controller 112, and buck mode controller 113. Select circuit 111 can select boost mode controller 112 or buck mode controller 113 to control switch type converter 12, based on detected value $V_{Iin}$ of input current $I_{in}$, of the external power supply and detected value $V_{IL}$ of the battery charging/discharging current.

Detected value $V_{Iin}$ of input current $I_{in}$ of the external power supply can be the detected value output by input current detector 13, or the detected value proportional to the output of input current detector 13. For example, when input current detector 13 is implemented by sampling resistor $R_{in}$, detected value $V_{Iin}$ of input current $I_{in}$ of the external power supply may be obtained by amplifying the voltage across sampling resistor $R_{in}$, via an error amplifier. Similarly, detected value $V_{IL}$ of the battery charging/discharging current may be obtained in this fashion. In addition, while the detected value of input current $I_{in}$ of the external power supply is described herein as a voltage signal, the detected value can alternatively or additionally be a current signal.

Boost mode controller 112 can control switch type converter 12 in the boost mode, such that input current $I_{in}$ is less than current threshold $I_1$. In the boost mode, the battery may be discharged to the load by switch type converter 12. In order to better protect switch type converter 12, boost mode controller 112 can to control switch type converter 12 in the boost mode such that battery discharging current $I_{DIS}$ is less than current threshold $I_2$.

Buck mode controller 113 can control switch type converter 12 in the buck mode such that input current $I_{in}$ charges the battery by switch type converter 12. In order to protect switch type converter 12, the battery charging current can be regulated to be less than another current threshold. In one example, when detected value $V_{Iin}$ of the input current of the external power supply is greater than input current threshold $V_{Ith1}$ and detected value $V_{ICHG}$ of the battery charging current is less than preset threshold $V_{ILL1}$ (e.g., close to zero), the load may need a relatively large current. In this case, switch type converter may enter the boost mode soon, the battery may be discharged, and select circuit 111 may select boost mode controller 112 to control switch type converter 12.

When detected value $V_{Iin}$ of the input current of the external power supply is less than input current threshold $V_{Ith2}$ and detected value $V_{IDIS}$ of battery discharging current is less than preset threshold $V_{ILL2}$, the current for the load can be normal. In this case, switch type converter 12 may enter the buck mode, the battery may be charged, and select circuit 111 can select buck mode controller to control switch type converter 12.

Detected value $V_{Iin}$ of the input current of the external power supply may be proportional to input current $V_{in}$. In addition, input current threshold $V_{Ith1}$ can be a voltage signal proportional to corresponding threshold current $I_{th1}$. Thus, when detected value $V_{Iin}$ of the input current of the external power supply is greater than input current threshold $V_{Ith1}$, input current $I_{in}$ may accordingly be greater than threshold current $I_{th1}$. For example, threshold current $I_{th1}$ is a threshold in the case of over-load, whereby when the input current of the external power supply is greater than the threshold, the external power supply may be damaged.

When control circuit 11 controls switch type converter 12 in the buck mode, external power supply $V_{in}$ can charge the battery and supply power to the load. Input current $I_{in}$ of the external power supply may be increased as the load is increasing, and when input current $I_{in}$ of the external power supply is greater than threshold current $I_{th1}$, switch type converter 12 may be controlled by control circuit 11. In this case, battery charging current $I_{CHG}$ may gradually decrease to zero, and when battery charging current $I_{CHG}$ is less than current $I_{LL1}$ (e.g., close to zero), detected value $V_{ICHG}$ of the battery charging current may be less than preset threshold $V_{ILL1}$. Based on such a relationship of the load requirement and the input current of the external power supply, switch type converter 12 may enter the boost mode, and the battery can discharge to the load. In this case, select circuit 111 can select boost mode controller 112 to control switch type converter 12 such that charging current $I_{DIS}$ is properly controlled. Correspondingly, after switch type converter 12 enters the boost mode, inductor current $I_L$ can change direction to be discharging current $I_{DIS}$ with an absolute value that gradually increases in order to reduce the burden of the external power supply.

When switch type converter 12 operates in a boost mode, external power supply $V_{in}$ can supply power to the load along with the battery. If the load decreases, the required current for the load may also decrease, and as a result, input current $I_{in}$ of the external power supply and battery discharging current $I_{DIS}$ of the battery can both decrease. When input current $I_{in}$ of the external power supply is less than threshold current $I_{th2}$, detected value $V_{Iin}$ of the external power supply may be less than input current threshold $V_{Ith2}$. Accordingly, control circuit 11 can control switch type converter 12 such that battery discharging current $I_{DIS}$ gradually decreases to zero. When battery discharging current $I_{DIS}$ is less than current $I_{LL2}$, detected value $V_{IDIS}$ of the battery discharging current can be less than preset threshold $V_{ILL2}$, and switch type converter 12 may enter the buck mode. Select circuit 111 can select buck mode controller 113 to control switch type converter 12, in order to properly control charging current $I_{CHG}$ of the battery. Then, inductor current $I_L$ of switch type converter 12 can change direction to be charging current $I_{CHG}$ with an absolute value that gradually increases.

Figure 3:
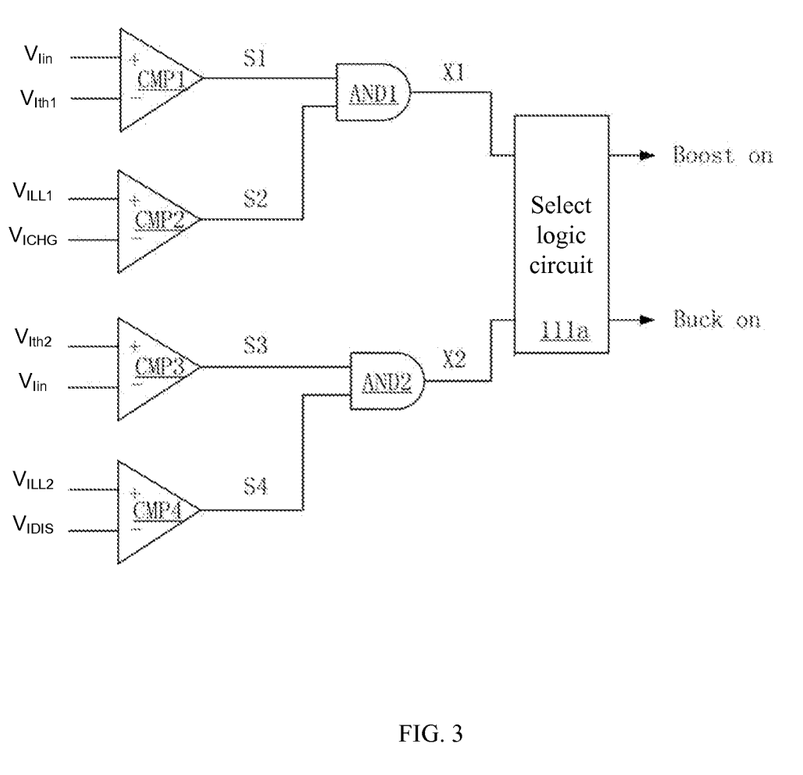
FIG. 3 is a schematic block diagram of a first example select circuit in the control circuit, in accordance with embodiments of the present invention.

Referring now to FIG. 3, shown is a schematic block diagram of a first example select circuit in the control circuit, in accordance with embodiments of the present invention. In this particular example, select circuit 111 can include comparators CMP1, CMP2, CMP3, and CMP4, logic gates AND1 and AND2, and select logic circuit 111a. Comparator CMP1 can compare the detected value of the input current of the external power supply (e.g., $V_{Iin}$) against input current threshold $V_{Ith1}$, and may generate comparison signal S1. Comparator CMP2 can compare the detected value of the battery charging current (e.g., $V_{ICHG}$) against preset threshold $V_{ILL1}$, and may generate comparison signal S2. Comparator CMP3 can compare the detected value of the input current of the external power supply (e.g., $V_{Iin}$) against input current threshold $V_{Ith2}$, and may generate comparison signal S3. Comparator CMP4 can compare detected value (e.g., $V_{IDIS}$) of battery discharging current against second preset threshold $V_{ILL2}$, and may generate comparison signal S4.

Logic gate AND1 can generate logic signal X1 according to comparison signals S1 and S2. When detected value $V_{Iin}$ of the input current of the external power supply is greater than input current threshold $V_{Ith1}$ and detected value $V_{ICHG}$ of battery charging current is less than preset threshold $V_{ILL1}$, logic signal X1 is a predetermined value. In this example, comparator CMP1 can receive detected value $V_{Iin}$ of the input current of the external power supply at its non-inverting input terminal, and input current threshold $V_{Ith1}$ at its inverting input terminal. Comparator CMP2 can receive preset threshold $V_{ILL1}$ at its non-inverting input terminal, and detected value $V_{ICHG}$ of the battery charging current at its inverting input terminal.

When detected value $V_{Iin}$ of the input current of the external power supply is greater than input current threshold $V_{Ith1}$, comparison signal S1 can be high. When detected value $V_{ICHG}$ of battery charging current is less than preset threshold $V_{ILL1}$, comparison signal S2 can be high. In such a case, logic gate AND1 (e.g., an AND-gate) can generate logic signal X1 as a high level when both of comparison signals S1 and S2 are high. Logic gate AND2 can generate logic signal X2 according to comparison signals S3 and S4. When detected value $V_{Iin}$ of the input current of the external power supply is less than input current threshold $V_{Ith2}$, and detected value $V_{IDIS}$ of the battery discharging current is less than preset threshold $VI_{LL2}$, logic signal X2 can be high when both of comparison signals S3 and S4 are high. Select logic circuit 111a can generate a select signal according to logic signals X1 and X2 in order to select boost mode controller 112 or buck mode controller 113 to control switch type converter 12.

Select circuit 111 can select boost mode controller 112 to control switch type converter 12 when detected value $V_{Iin}$ of the input current of the external power supply is greater than input current threshold $V_{Ith1}$ and detected value $V_{ICHG}$ of the battery charging current is less than preset threshold $V_{ILL1}$. Also, select circuit 111 can select buck mode controller 113 to control switch type converter 12 when detected value $V_{Iin}$ of the input current of the external power supply is less than input current threshold $V_{Ith2}$ and detected value $V_{IDIS}$ of battery discharging current is less than preset threshold $V_{ILL2}$. Further, the mode can be made with a delay time after satisfying conditions to avoid interference between the signals.

Figure 4:
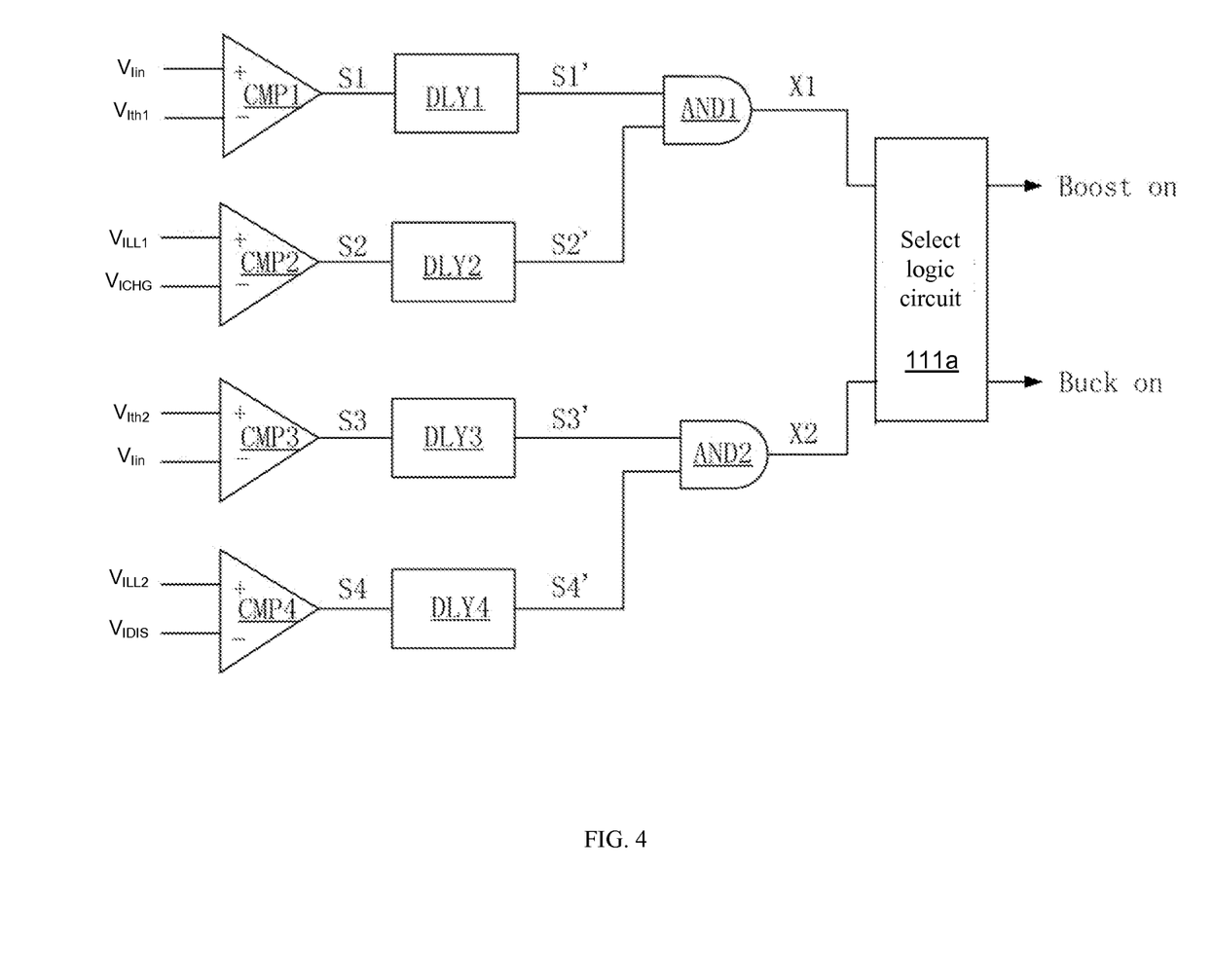
FIG. 4 is a schematic block diagram of a second example select circuit in the control circuit, in accordance with embodiments of the present invention.

Referring now to FIG. 4, shown is a schematic block diagram of a second example select circuit in the control circuit, in accordance with embodiments of the present invention. In this particular example, select circuit 111 can include comparators CMP1, CMP2, CMP3, and CMP4, delay circuits DLY1, DLY2, DLY3, and DLY4, logic gates AND1 and AND2, and select logic circuit 111a. The functions of comparators CMP1-CMP4 can be substantially the same as that in FIG. 2. In this particular example, delay circuits DLY1-DLY4 can be utilized to delay corresponding comparison signals S1-S4 for the given delay times, and to generate delayed comparison signals S1'-S4'. Logic gate AND1 can generate logic signal X1 according to delayed comparison signals S1' and signal S2'. After a preset time when detected value $V_{Iin}$ of the input current of the external power supply is greater than input current threshold $V_{Ith1}$ and detected value $V_{ICHG}$ of the battery charging current is less than preset threshold $V_{ILL1}$, logic signal X1 can be a predetermined level.

Logic gate AND2 can generate logic signal X2 according to delayed comparison signals S3' and S4'. After a preset time when detected value $V_{Iin}$ of the input current of the external power supply is less than input current threshold $V_{Ith2}$ and detected value $V_{IDIS}$ of the battery discharging current is less than preset threshold $V_{ILL2}$, logic signal X2 can be a predetermined value. Logic gate AND2 (e.g., an AND-gate) can generate logic signal X2 as a high level when both of comparison signals S3 and S4 are high. Select logic circuit 111a can generate a select signal according to logic signals X1 and X2 in order to select boost mode controller 112 or buck mode controller 113 to control switch type converter 12.

Figure 5A:
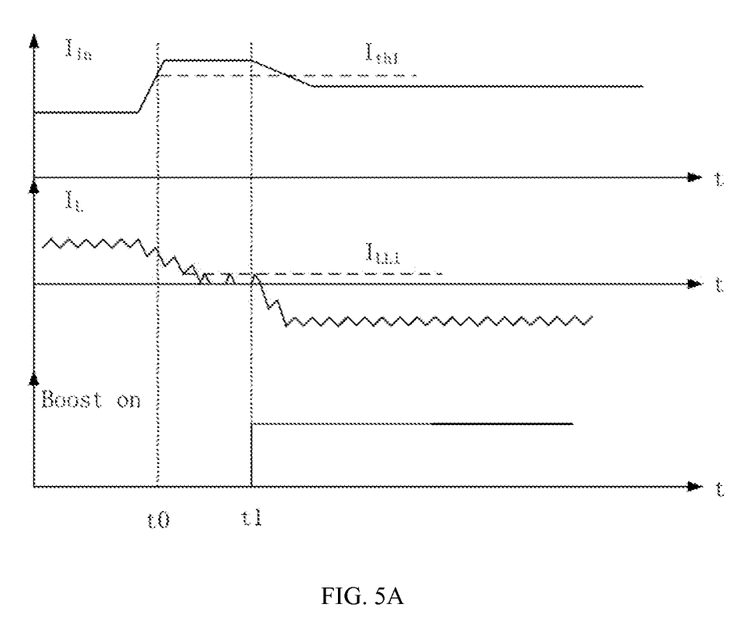
FIGS. 5A and 5B are waveform diagrams showing example operation of the battery power supply device, in accordance with embodiments of the present invention.
Figure 5B:
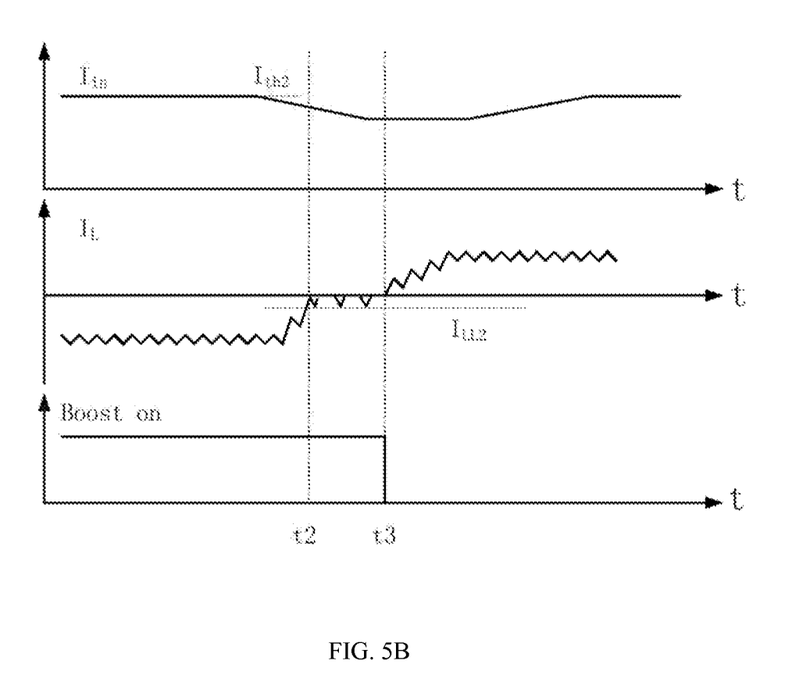

Referring now to FIGS. 5A and 5B, shown are waveform diagrams showing example operation of the battery power supply device, in accordance with embodiments of the present invention. In FIG. 5A, at time t0, switch type converter 12 can operate in a buck mode, control circuit 11 can control according to a buck mode, and external power supply may supply power to the battery and the load. When the load is increasing, the input current may also increase, and at time t0, input current $I_{in}$ can be greater than threshold current $I_{th1}$. From time t0 to time t1, buck mode controller 113 can control switch type converter 12 such that battery charging current $I_{CHG}$ gradually decreases to zero. When battery charging current $I_{CHG}$ is less than current $I_{LL1}$ (e.g., close to zero), and battery charging current $I_{CHG}$ is less than the preset threshold $V_{ILL1}$, switch type converter 12 may enter the boost mode (e.g., relatively soon).

After a delay time, select circuit 111 can select boost mode controller 112 to control switch type converter 12 such that battery discharging current $I_{DIS}$ can be well controlled. Accordingly, inductor current $I_L$ of switch type converter 12 can change direction to be discharging current $I_{DIS}$, and the absolute value may gradually rise in order to reduce the burden of the external power supply. As the inductor current can be gradually reduced to zero, switch type converter 12 may naturally enter the boost mode, and thus soft-start may not be necessary when switching the control modes.

In FIG. 5B, switch type converter 12 can operate in a boost mode, external power supply $V_{in}$ can supply power to the load along with the battery, and control circuit 11 can control switch type converter 12 such that input current $I_{in}$ of the external power supply and battery discharging current $I_{DIS}$ are less than corresponding values. If the load decreases, input current $I_{in}$ and battery discharging current $I_{DIS}$ may also decrease. At time t2, when input current $I_{in}$ is less than threshold current $I_{th2}$, detected value $V_{Iin}$ of the input current may also be less than input current threshold $V_{Ith2}$. Accordingly, battery discharging current $I_{DIS}$ may gradually reduce to zero. When battery discharging current $I_{DIS}$ is less than current $I_{LL2}$, detected value $V_{IDIS}$ of the battery discharging current may be less than preset threshold $V_{ILL2}$, where current $I_{LL2}$ is close to zero. After a delay time, at time t3, the battery can recover to a charging state, and select circuit 111 may select buck mode controller 113 to control switch type converter 12 such that battery discharging current $I_{CHG}$ may be well controlled. Accordingly, inductor current $I_L$ of switch type converter 12 can change direction to be discharging current $I_{CHG}$ with an absolute value that gradually rises.

In this example, when switch type converter 12 operates in a buck mode, power switch Q1 can be configured as a main power switch of the circuit, and power switch Q2 can be configured as a freewheeling switch. When switch type converter 12 operates in a boost mode, power switch Q2 can be configured as the main power switch, and power switch Q1 can be configured as the freewheeling switch. Boost mode controller 112 in this example can control the duty cycle of switch power Q2, which can be configured as the main power switch in the boost mode, in order to further control the battery discharging current.

In this example, boost mode controller 112 can control power switches Q1 and Q2 of switch type converter 12 according to error value $V_{EA1}$ and the detected value of the current flowing from switch type converter 12 to the load (e.g., the detected value of the current flowing through power switch Q1 of switch type converter 12). Boost mode controller 112 can also control the duty cycle of the switching control signal of power switch Q2 to increase when input current $I_{in}$ of the external power supply increases to a level of current threshold $I_1$, in order to increase discharging current $I_{DIS}$.

Error value $V_{EA1}$ can represent a difference between input current $I_{in}$ of the external power supply and current threshold $I_1$. For example, boost mode controller 112 can generate switching control signals according to error values $V_{EA1}$ and $V_{EA2}$, as well as the detected value of the current flowing from switch type converter 12 to the load (e.g., the detected value of the current flowing power switch Q1 in switch type converter 12). The switching control signals can control power switches Q1 and Q2 such that the duty cycle of the switching control signal of power switch Q2 configured as the main power switch increases when input current $I_{in}$ of the external power supply is increased to a level of current threshold $I_1$. This can increase battery discharging current $I_{DIS}$, and control the duty cycle of power switch Q2 to reduce when battery discharging current $I_{DIS}$ increases to a level of current threshold $I_2$, in order to reduce battery discharging current $I_{DIS}$.

Error value $V_{EA2}$ can represent a difference between current threshold $I_2$ and battery discharging current $I_{DIS}$. In different situations, one of error value $V_{EA1}$ and error value $V_{EA2}$ can be selected as the error reference for peak current control or valley current control. In this way, input current $I_{in}$ of the external power supply and battery discharging current $I_{DIS}$ can be controlled at substantially the same time.

Figure 6:
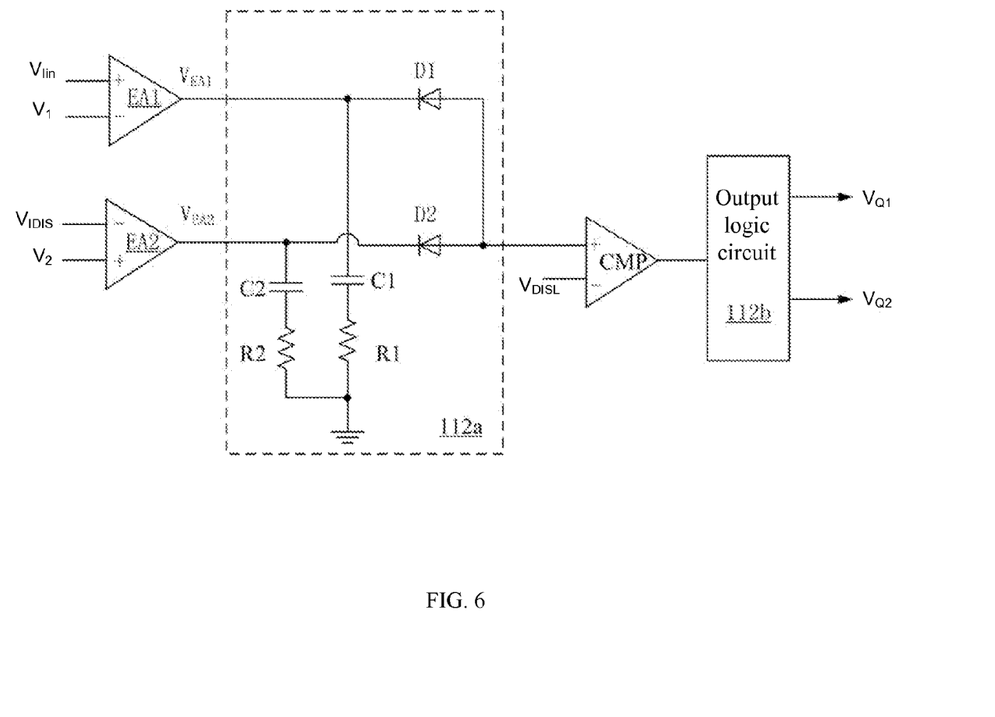
FIG. 6 is a schematic block diagram of an example boost control circuit in the control circuit, in accordance with embodiments of the present invention.

Referring now to FIG. 6, shown is a schematic block diagram of an example boost control circuit in the control circuit, in accordance with embodiments of the present invention. Here, boost mode controller 112 can include error amplifier EA1, error amplifier EA2, comparator select circuit 112a, comparator CMP (e.g., a hysteresis comparator), and output logic circuit 112b. Error amplifier EA1 can receive detected value $V_{Iin}$ of the input current of the external power supply, and proportional voltage $V_1$ of the current threshold $I_1$, and may generate error value $V_{EA1}$. Error amplifier EA2 can receive battery discharging current $V_{IDIS}$, and proportional voltage $V_2$ of current threshold $I_2$, and may generate error value $V_{EA2}$. Comparison select circuit 112a can select and input the smaller or lesser one of the error values $V_{EA1}$ and $V_{EA2}$ to the non-inverting input terminal of comparator CMP.

For example, comparison select circuit 112a can include two RC compensation circuits, and diodes D1 and D2. The RC compensation circuits can connect between the output terminals of error amplifiers EA1 and EA2 and ground. One RC compensation circuit can include resistor R1 and capacitor C1 connected in series, and the other RC compensation circuit can include resistor R2 and capacitor C2 connected in series. Diodes D1 and D2 may be respectively connected between output terminals of error amplifiers EA1 and EA2, and the non-inverting input terminal of comparator CMP. The inverting input terminal of comparator CMP can receive detected value $V_{DISL}$ of the current flowing from switch type converter 12 to the load. For example, a voltage across power switch Q1 of switch type converter 12 can be detected to represent the current flowing from switch type converter 12 to the load.

Output logic circuit 112b can receive an output signal of comparator CMP, and may generate switching control signals $V_{Q1}$ and $V_{Q2}$ to control switch type converter 12. Output logic circuit 112b can include an RS flip-flop, with an input terminal coupled to comparator CMP, and another input terminal that receives a clock signal, so as to generate a control signal. In the boost mode control circuit of FIG. 6, when input current $I_{in}$ of the external power supply is less than current threshold $I_1$, and battery discharging current $I_{DIS}$ is less than current threshold $I_2$, $V_{EA1}=V_{Iin}-V_1<0$; $V_{EA2}=V_2-V_{IDIS}>0$. Error amplifier $V_{EA1}$ can be a negative voltage of relatively small value, which can be used as an error reference. When input current $I_{in}$ of the external power supply is greater than current threshold $I_1$, battery discharging current $I_{DIS}$ is less than current threshold $I_2$, so: $V_{EA1}=V_{Iin}-V_1>0$; $V_{EA2}=V_2-V_{IDIS}>0$.

The error reference can be a positive voltage, no matter whether error value $V_{EA1}$ or error value $V_{EA2}$ is the smaller/lesser one. Therefore, the error reference input to the non-inverting input terminal of comparator CMP can be increased, and the moment that comparator CMP transitions may be earlier (e.g., the circuit in FIG. 6 can be controlled by a valley control mode), and power switch Q2 can be turned on ahead of time. In this way, the duty cycle of switch type converter 12 may increase in the boost mode in order to increase battery discharging current $I_{DIS}$, and to reduce input current $I_{in}$ of the external power supply.

Those skilled in the art will recognize that the error reference may be increased when the circuit is controlled by a peak control mode. In this case, the turn off of power switch Q2 can be put off by regulating the level change transition time of comparator CMP to correspond to the turn-off time of power switch Q2, in order to increase the duty cycle of switch type converter 12 in the boost mode. When battery discharging current $I_{DIS}$ is increased to a level of current threshold $I_2$, input current $I_{in}$ of the external power supply can be less than current threshold $I_1$, so: $V_{EA1}=V_{Iin}-V_1<0$; $V_{EA2}=V_2-V_{DISL}<0$ In this case, the error reference here can be a negative voltage regardless of whether error value $V_{EA1}$ or error value $V_{EA2}$ is the smaller/lesser one. Therefore, the error reference input to the non-inverting input terminal of comparator CMP may be pulled down. Thus, the transition time of comparator CMP may be delayed, and the turn-on of power switch Q2 may be delayed. In this way, the duty cycle of switch type converter 12 in the boost mode may decrease, in order to reduce battery discharging current $I_{DIS}$. Similarly, if the circuit is controlled by a peak control mode, the error reference may be pulled down, and power switch Q2 may be turned off earlier by regulating the transition time of comparator CMP to correspond to the turn-off time of power switch Q2. In this way, the duty cycle of switch type converter 12 can be reduced in the boost mode.

Those skilled in the art will recognize that various modifications may be made on the exemplified circuit based on the above described principles in order to achieve the same or similar technical results. Buck mode controller 113 can also be controlled by a peak mode. In this case, when the current flowing through power switch Q1 reaches peak or a limited value, power switch Q1 may be turned off. Those skilled in the art will recognize that though the detected values of various current parameters use voltage signals, the detected values of various current parameters can alternatively or additionally use current signals.

The states of the switch type converter can be determined according to the input current of the external power supply and the battery discharging current, in order to select the corresponding boost mode controller or buck mode controller. This can guarantee that the input current of the external power supply and the battery discharging current change within a preset range, in order to better protect the adapter providing the external power supply, and to avoid damage on the adapter of the external power supply or the battery power supply device due to increased load.

Figure 7:
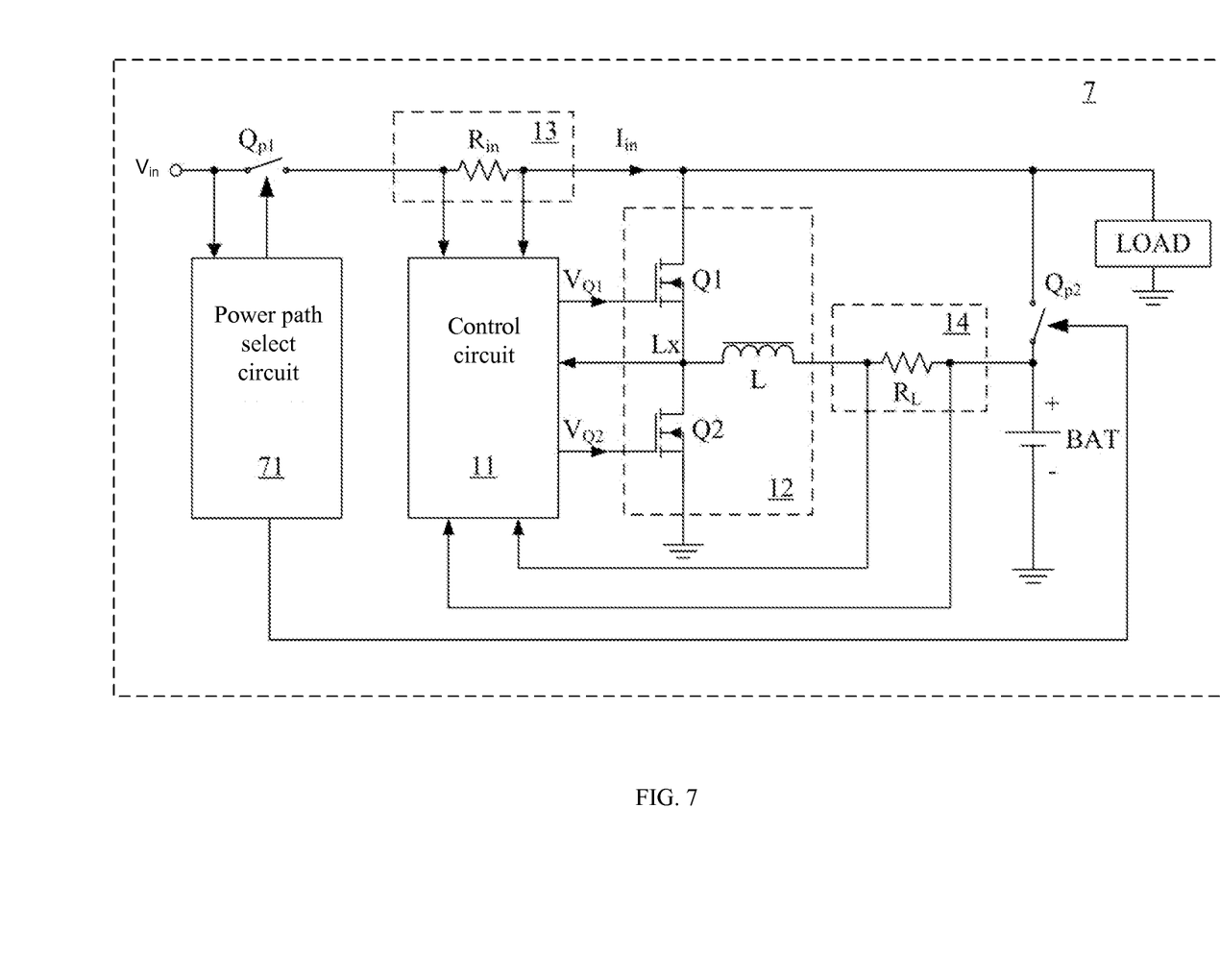
FIG. 7 is a schematic block diagram of an example battery power supply device, in accordance with embodiments of the present invention.

Referring now to FIG. 7, shown is a schematic block diagram of an example battery power supply device, in accordance with embodiments of the present invention. In this particular example, battery power supply device 7 can include control circuit 11, switch type converter 12, input current detector 13, and battery charging/discharging detector 14, as shown in FIG. 1, and discussed above. In order to switch between battery power and the external power supply, battery power supply device 7 may also include power path select circuit 71, and path select switches $Q_{p1}$ and $Q_{p2}$. Path select switch $Q_{p1}$ can connect between the external power supply and input current detector 13, and path select switch $Q_{p2}$ can connect between the battery and the load.

Power path select circuit 71 can detect the input voltage of the external power supply. When input voltage $V_{in}$ of the external power supply is in a normal condition/state, path select switch $Q_{p1}$ can be on, and path select switch $Q_{p2}$ can be off, such the external power supply provides power to the load. In this case, when the required current for the load is relatively small, switch type converter 12 can operate in a buck mode, and the external power supply may supply power to the load and charge the battery at the same time via switch type converter 12. However, when the load requires a relative large current, switch type converter 12 may operate in a boost mode. In this case, the battery can be discharged by the switch type converter 12, and the battery and the external power supply can together supply power to the load. When input voltage $V_{in}$ of the external power supply is abnormal (e.g., over-voltage, under-voltage, etc.) or the external power supply cannot be detected, power path select circuit 71 can control path select switch $Q_{p1}$ to be off, and path select switch $Q_{p2}$ to be on, such that the battery may supply power directly to the load via path select switch $Q_{p2}$.

In one embodiment, a method of controlling a switch type converter can include: (i) selecting a boost mode or a buck mode according to a detected value of an input current of an external power supply and a detected value of a battery charging/discharging current, to control a switch type converter, where the switch type converter comprises a first terminal coupled to a power supply line from the external power supply to a load, and a second terminal coupled to a battery; (ii) controlling an input current of the external power supply to be less than a first input current threshold when the switch type converter operates in the boost mode; and (iii) controlling the battery charging current to charge the battery when the switch type converter operates in the buck mode.

Figure 8:
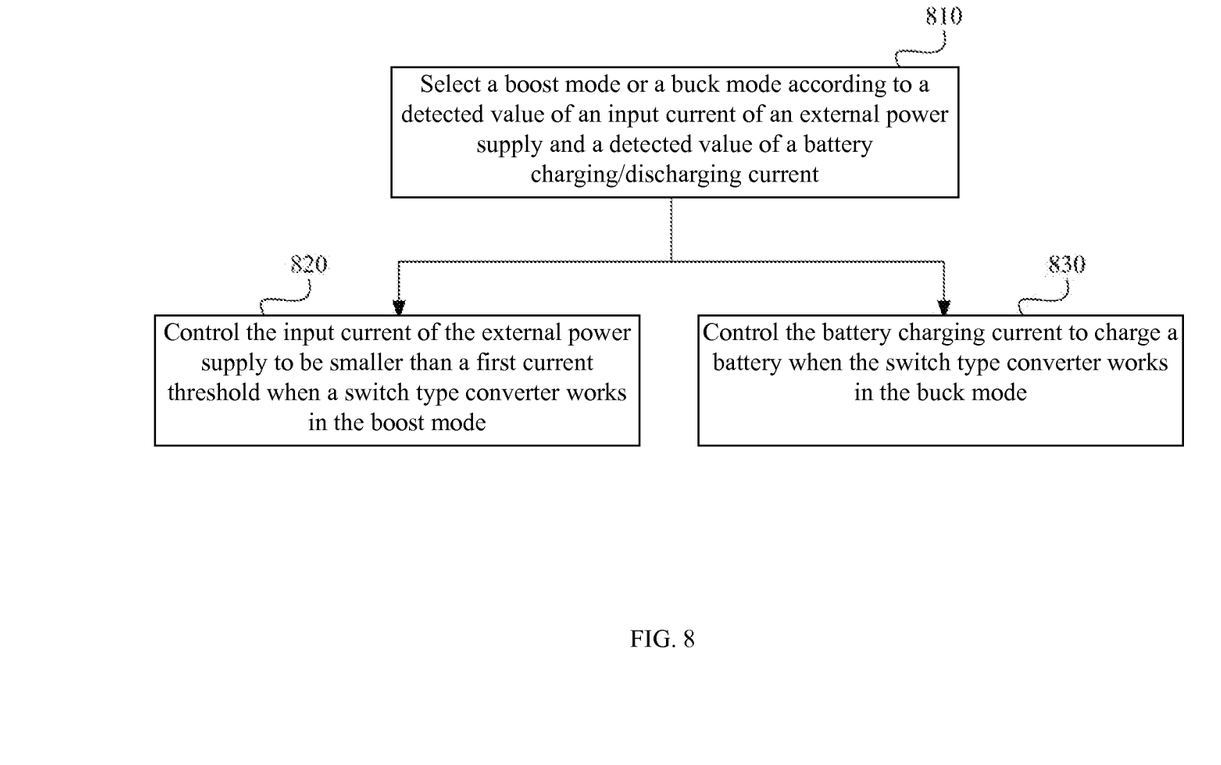
FIG. 8 is flow diagram of an example control method, in accordance with embodiments of the present invention.

Referring now to FIG. 8, shown is flow diagram of an example control method, in accordance with embodiments of the present invention. This example method can be configured to control a switch type converter (e.g., 12) that has a terminal coupled to a power supply line from an external power supply (e.g., $V_{in}$) to a load, and another terminal coupled to a battery (e.g., BAT). At step 810, a boost mode or a buck mode can be selected according to a detected value of an input current of the external power supply, and a detected value of a battery charging/discharging current, in order to control the switch type converter. At step 820, the input current of the external power supply can be controlled to be less than a first input current threshold (e.g., $V_{Ith1}$) when the switch type converter operates in the boost mode. At step 830, the battery charging current can be controlled to charge the battery via the switch type converter when the switch type converter operates in the buck mode.

For example, 820 can also include controlling the battery discharging current to be less than a second input current threshold (e.g., $V_{Ith2}$) when the switch type converter operates in a boost mode. For example, 830 can also include controlling the battery charging current to be less than a third current threshold. For example, step 810 can further include selecting the boost mode to control the switch type converter when the detected value of the input current of the external power supply is greater than the first input current threshold and the detected value of the battery charging current is less than a first preset threshold (e.g., $V_{ILL1}$), and selecting the buck mode controller to the switch type converter when the detected value of the input current of the external power supply is less than the second input current threshold and the detected value of the battery discharging current is less than the second preset threshold.

For example, step 820 can also include controlling the switch type converter according to a first error value (e.g., $V_{EA1}$) and a second error value (e.g., $V_{EA2}$) as well as the detected value of a current flowing from the switch type converter to the load, such that the battery discharging current can increase when the input current of the external power supply is greater than the first input current threshold, and the battery discharging current may decrease when the battery discharging current is greater than the second input current threshold. The first error value may represent a difference between the input current of the external power supply and the first input current threshold, and the second error value may represent a difference between the second input current threshold and the battery discharging current.

In this way, the states of the switch type converter can be determined according to the input current of the external power supply and the battery charging/discharging current, in order to select the corresponding boost mode controller or the buck mode controller. When in the boost mode, the input current of the external power supply and the battery discharging current may change in a predetermined range in order to better protect the adapter of the external power supply, and to avoid damage on the adaptor of the external power supply or battery power supply device due to an increased load.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit, comprising:
   a) a boost mode controller configured to control a switch type converter to operate in a boost mode such that an input current is less than a first input current threshold, wherein said switch type converter comprises a first terminal coupled to a power supply line from an external power supply to a load, and a second terminal coupled to a battery;
   b) a buck mode controller configured to control said switch type converter to operate in a buck mode; and
   c) a select circuit configured to select either said boost mode controller or said buck mode controller to control said switch type converter based on a detected value of said input current of said external power supply and a detected value of a battery charging/discharging current.

2. The control circuit of claim 1, wherein said boost mode controller is configured to control said switch type converter to operate in said boost mode such that said battery discharging current is less than a second input current threshold.

3. The control circuit of claim 1, wherein said buck mode controller is configured to control said switch type converter to operate in said buck mode such that said battery charging current is less than a third current threshold.

4. The control circuit of claim 2, wherein said select circuit is configured to select said boost mode controller when said detected value of said external power supply is greater than said first input current threshold and said detected value of said battery charging current is less than a first preset threshold, and to select said buck mode controller when said detected value of said input current of said external power supply is less than said second input current threshold and said detected value of said battery discharging current is less than said second preset threshold.

5. The control circuit of claim 4, wherein said select circuit comprises:
   a) a first comparator configured to compare said detected value of said input current of said external power supply against said first input current threshold, and to generate a first comparison signal;
   b) a second comparator configured to compare said detected value of said battery charging current and said first preset threshold, and to generate a second comparison signal;
   c) a third comparator configured to compare said detected value of said input current of said external power supply against said second input current threshold, and to generate a third comparison signal;
   d) a fourth comparator configured to compare said detected value of said battery discharging current and said second preset threshold, and to generate a fourth comparison signal;
   e) a first logic gate configured to generate a first logic signal according to said first and second comparison signals;
   f) a second logic gate configured to generate a second logic signal according to said third and fourth comparison signals; and
   g) a select logic circuit configured to generate a select signal to select said boost mode controller or said buck mode controller according to said first and second logic signals.

6. The control circuit of claim 5, wherein, said select circuit further comprises:
   a) a first delay circuit configured to delay said first comparison signal for a first delay time, and to generate a first delayed comparison signal;
   b) a second delay circuit configured to delay said second comparison signal for a second delay time, and to generate a second delayed comparison signal;
   c) a third delay circuit configured to delay said third comparison signal for a third delay time, and to generate a third delayed comparison signal;
   d) a fourth delay circuit configured to delay said fourth comparison signal for a fourth delay time, and to generate a fourth delayed comparison signal;

e) said first logic gate configured to receive said first and second delayed comparison signals, and to generate a first delayed logic signal;
f) said second logic gate configured to receive said third and fourth delayed comparison signals, and to generate a second delayed logic signal; and
g) said select logic circuit configured to generate said select signal according to said first and second delayed logic signals.

7. The control circuit of claim 2, wherein said switch type converter comprises:
   a) first and second power switches, wherein said first power switch is configured as a main power switch when said switch type converter operates in a said buck mode, and said second power switch is configured as said main power switch when said switch type converter operates in a said boost mode; and
   b) said boost mode controller configured to generate first and second switching control signals to control said first and second power switches based on a first error value and a detected value of a current flowing from said switch type converter to said load, and to control a duty cycle of said second switching control signal to increase when said input current of said external power supply is increased to a level of said first input current threshold, such that said battery discharging current is increased, wherein said first error value represents a difference between said input current of said external power supply and said first input current threshold.

8. The control circuit of claim 7, wherein said boost mode controller is configured to generate said first and second switching control signals based on based on said first error value and a second error value and said detected value of said current flowing from said switch type converter to said load, and to control said duty cycle of said second switching control signal to decrease when said battery discharging current is increased to a level of said second input current threshold, such that said battery discharging current decreases, wherein said second error value represents a difference between said second input current threshold and said battery discharging current.

9. The control circuit of claim 8, wherein said boost mode control circuit comprises:
   a) a first error amplifier configured to compare said detected value of said input current against said first input current threshold, and to generate said first error value;
   b) a second error amplifier configured to compare detected value of said battery discharging current against said second input current threshold, and to generate said second error value;
   c) a comparison select circuit configured to select a smaller of said first and second error values to provide to a non-inverting input terminal of a comparator, wherein an inverting input terminal of said comparator is configured to receive said detected value of said current flowing from said switch type converter to said load; and
   d) an output logic circuit configured to receive an output signal of said comparator, and to generate said switching control signals.

10. A battery power supply device, comprising:
    a) an input current detector;
    b) a battery charging/discharging current detector; and
    c) said control circuit of claim 1.

11. A method of controlling a switch type converter, the method comprising:
    a) selecting a boost mode or a buck mode according to a detected value of an input current of an external power supply and a detected value of a battery charging/discharging current, to control said switch type converter, wherein said switch type converter comprises a first terminal coupled to a power supply line from said external power supply to a load, and a second terminal coupled to a battery;
    b) controlling an input current of said external power supply to be less than a first input current threshold when said switch type converter operates in said boost mode; and
    c) controlling said battery charging current to charge said battery when said switch type converter operates in said buck mode.

12. The method of claim 11, further comprising controlling said battery discharging current to be less than a second input current threshold when said switch type converter operates in said boost mode.

13. The method of claim 11, wherein said controlling said battery charging current to charge said battery comprises controlling said battery charging current to be less than a third current threshold.

14. The method of claim 11, wherein said selecting said boost mode or said buck mode comprises:
    a) selecting said boost mode when said detected value of said input current of said external power supply is greater than said first input current threshold and said detected value of said battery charging current is less than a first preset threshold; and
    b) selecting said buck mode controller when said detected value of said input current of said external power supply is less than said second input current threshold and said detected value of said battery discharging current is less than a second preset threshold.

15. The method of claim 11, wherein said switch type converter comprises first and second power switches, wherein said first power switch is configured as a main power switch when said switch type converter operates in a said buck mode, and said second power switch is configured as said main power switch when said switch type converter operates in a said boost mode, and the method further comprising:
    generating, by said boost mode controller, first and second switching control signals for controlling said first and second power switches based on a first error value and a detected value of a current flowing from said switch type converter to said load, and controlling a duty cycle of said second switching control signal to increase when said input current of said external power supply is increased to a level of said first input current threshold, such that said battery discharging current is increased, wherein said first error value represents a difference between said input current of said external power supply and said first input current threshold.

16. The method of claim 15, wherein said generating said first and second switching control signals further comprises generating said first and second switching control signals based on based on said first error value and a second error value and said detected value of said current flowing from said switch type converter to said load, and controlling said duty cycle of said second switching control signal to decrease when said battery discharging current is increased to a level of said second input current threshold, such that said battery discharging current decreases, wherein said second error value represents a difference between said second input current threshold and said battery discharging current.

\* \* \* \* \*